United States Patent
McLeod

(10) Patent No.: US 8,220,509 B1
(45) Date of Patent: Jul. 17, 2012

(54) PARQUET TILE, FLOOR AND METHOD

(76) Inventor: Whitney G. McLeod, Arcata, CA (US)

( * ) Notice: Subject to any disclaimer, the term of this patent is extended or adjusted under 35 U.S.C. 154(b) by 521 days.

(21) Appl. No.: 12/291,341

(22) Filed: Nov. 6, 2008

Related U.S. Application Data

(60) Provisional application No. 61/002,144, filed on Nov. 6, 2007.

(51) Int. Cl.
*B27M 3/00* (2006.01)
(52) U.S. Cl. ........ 144/372; 144/48; 144/144.1; 144/345
(58) Field of Classification Search ............ 52/390–392; 144/40, 144.1, 344, 345, 359, 361, 363, 367, 144/368, 372
See application file for complete search history.

(56) References Cited

U.S. PATENT DOCUMENTS

| | | | | |
|---|---|---|---|---|
| 4,299,263 | A | * | 11/1981 | Skinner .................... 144/144.51 |
| 4,353,672 | A | * | 10/1982 | Smith ............................. 409/97 |
| 6,003,571 | A | * | 12/1999 | Broussard .................... 144/154 |
| 6,722,051 | B2 | * | 4/2004 | Carlson et al. .................. 33/562 |
| 7,997,308 | B2 | * | 8/2011 | Stepp ............................. 144/3.1 |
| 2003/0172993 | A1 | * | 9/2003 | Godfrey ..................... 144/144.1 |
| 2005/0109181 | A1 | * | 5/2005 | Zawadzki et al. .............. 83/565 |
| 2006/0102252 | A1 | * | 5/2006 | Justin ............................ 144/372 |
| 2008/0105335 | A1 | * | 5/2008 | Janzen .......................... 144/363 |

OTHER PUBLICATIONS http://web.archive.org/web/20080408025523/http://www.winecellarinnovations.com/dfloor_vint.htm.*

* cited by examiner

*Primary Examiner* — William Gilbert

(57) ABSTRACT

Parquet tiles cut from the ends of barrels, preferably wooden wine or whisky barrels; a method of forming the tiles using a tongue- and groove-defining template; and parquet flooring which uses the tiles, are disclosed.

1 Claim, 5 Drawing Sheets

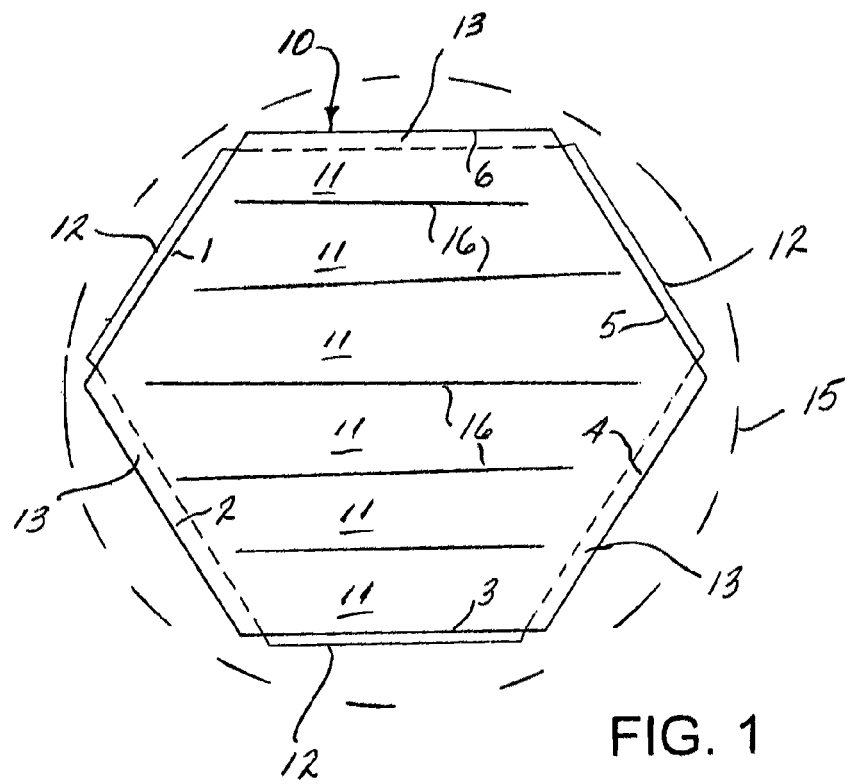
FIG. 1
FIG. 6  FIG. 7
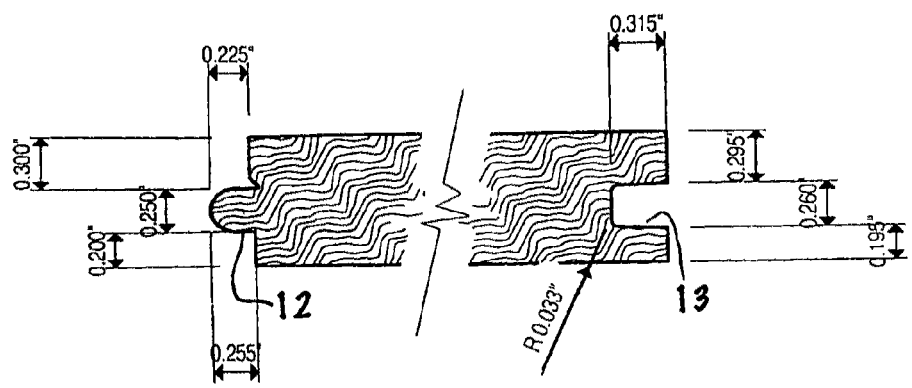

PARQUET TILE, FLOOR AND METHOD

This application claims the benefit of U.S. Provisional Application No. 61/002,144, filed Nov. 6, 2007, inventor Whitney G. McLeod. Application No. 61/002,144 is hereby incorporated by reference.

I. BACKGROUND OF THE INVENTION

A. Field of the Invention

The present invention relates to parquet floors and to tiles and methods for forming parquet floors.

B. Description of the Related Art

Typically, parquet floors have used assemblies of square or rectangular tiles. The tiles are manufactured by forming strips of wood or other material and joining the strips along tongue and groove edges or to an underlayer.

II. SUMMARY OF THE INVENTION

It is an object of the present invention to provide a high quality wood parquet tile which is simple to form and which can be arranged in numerous patterns.

It is also an object of the present invention to provide methods for readily and reproducibly forming parquet tiles and for arranging the tiles in numerous patterns to form parquet floors.

In one aspect, the present invention is embodied in a wood parquet tile comprising a hexagonal section of a barrel end, the barrel end being formed of strips of wood which have longitudinal edges and are joined together along the longitudinal edges, and the tile further comprising tongues and grooves formed along alternating sides of the tile.

In another aspect, the present invention is embodied in wood parquet flooring comprising: a plurality of interfitting tiles, each tile comprising a hexagonal section of an end of a barrel, the barrel end being formed of strips of wood which have longitudinal edges and are joined together along the longitudinal edges; and each tile further comprising tongues and grooves formed along alternating sides of that tile In another, method aspect, the present invention is embodied in a method of forming a parquet floor tile, comprising:

cutting a tile from an end of a wooden barrel, the tile having six edges forming a regular hexagon, and the end of the barrel being formed from wooden strips, the wooden strips having longitudinal edges and being joined along the longitudinal edges;

cutting one of either tongues or grooves along a first set of three alternating sides of the hexagonal tile, using a template comprising a regular triangle to control the cutting of the first set of sides and to protect a second set of three alternating sides from being cut; and rotating the relative orientation of the tile and the template 180° and cutting the other of tongues or grooves along the second set of three alternating sides, using the triangular template to control the cutting of the second set of sides and to protect the first set of sides from being cut.

III. BRIEF DESCRIPTION OF THE DRAWING

FIG. 1 is a plan view of a barrel head tile according to the present invention, and depicts in phantom the outline of the barrel head from which the tile is cut.

FIGS. 6 and 7 depict the preferred dimensions for the tongues and grooves, respectively, in opposite sides of a ¾ inch thick finished hexagonal tile according to FIG. 1, used in a standard oak floor.

IV. DETAILED DESCRIPTION OF THE PREFERRED EMBODIMENT(S)

A. Hexagonal Parquet Tile 10

FIG. 1 is a plan view of a parquet tile 10 in accordance with the present invention. Preferably the tile 10 is a regular, equilateral hexagon which is cut from the circular end 15 of a barrel, more preferably a wooden barrel, and most preferably, an oak wine barrel or whisky barrel. Representative dimensions are approximately 22 inches for the diameter of the wine barrel end and approximately 18 inches for the side-to-side width of the associated tile 10. Such barrels typically have ends 15 which are formed of elongated joined strips 11-11 of oak. The strips 11-11 have longitudinal edges 16-16 which are joined by pegs or by tongues and grooves. The hexagonal-shaped tiles 10 makes efficient use of the circular barrel ends, leaving relatively little scrap.

Figure 2:
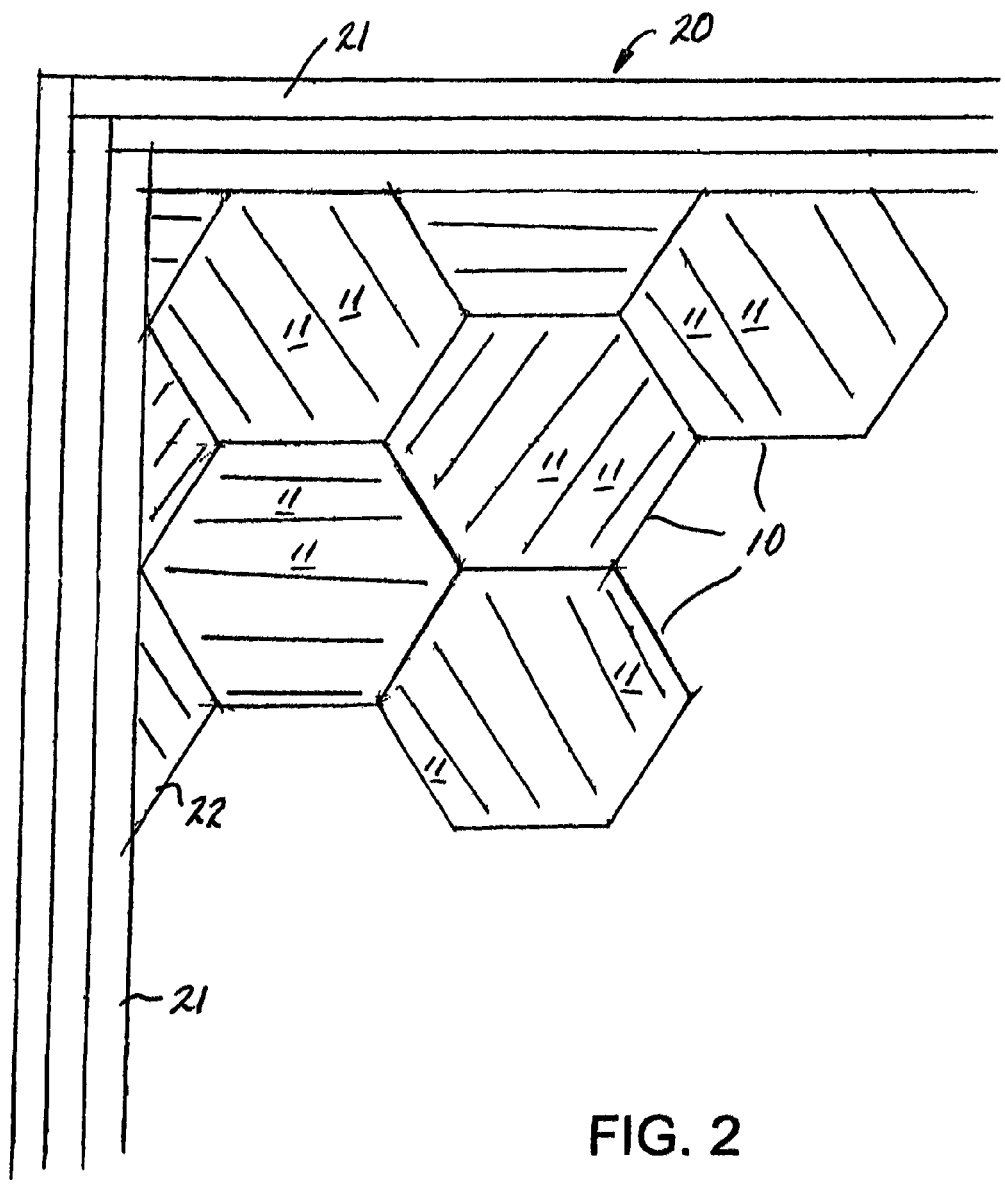
FIG. 2 is a partial view of a parquet floor, according to the present invention, which is formed using the tile of FIG. 1.

Each hexagonal tile 10 is planed flat along at least one of its two opposite major surfaces, to provide a smooth surface and appearance or to facilitate laying the tile flat to form flooring (see 20, FIG. 2). Also, tongues 12 and grooves 13 are formed along alternating sides of the tile 10. (For convenience, the tongues 12 and grooves 13 are depicted in FIG. 1, although obviously they are formed after the tile 10 is cut from the barrel end.) For convenient reference, the tile sides are numbered 1-6, with the tongues 12 being formed on alternating sides 1, 3 and 5; and the grooves being formed on alternating sides 2, 4 and 6.

The use here of barrel ends having existing strips 11-11 eliminates the usual steps of forming and assembling the strips. In another advantage, the parallel strip, hexagonal tile 10 can be positioned in several different orientations, thereby providing numerous possible flooring patterns.

B. Parquet Floor 20

FIG. 2 illustrates a flooring embodiment 20 of the present invention, namely, one of the numerous floor patterns which are possible using the hexagonal tiles 10-10 of FIG. 1. The illustrated pattern uses tile 10-10 which are cut from their barrel ends so that the strips 11-11 of each tile are generally parallel to two opposite sides of the tile. The flooring 20 uses three different orientations of the parallel strips 11-11: horizontal; angled downwardly left to right; and angled downwardly right to left. Each border of the flooring 20 comprises several elongated wood strips 21-21. The spaces between the borders 21 and the full tiles 10-10 are filled by partial tile sections 22-22.

The tiles 10-10 can be arranged with their strips 11-11 in other non-parallel orientations. Also, the tiles 10-10 can be arranged with the strips 11-11 parallel. The parallel orientation also provides an appearance which emphasizes the hexagonal outline of the tiles and, where applicable, the different side-to-side positions and the different widths of the strips 11-11 from tile to tile.

C. Rotary Shapers 30, 50

Figure 3:
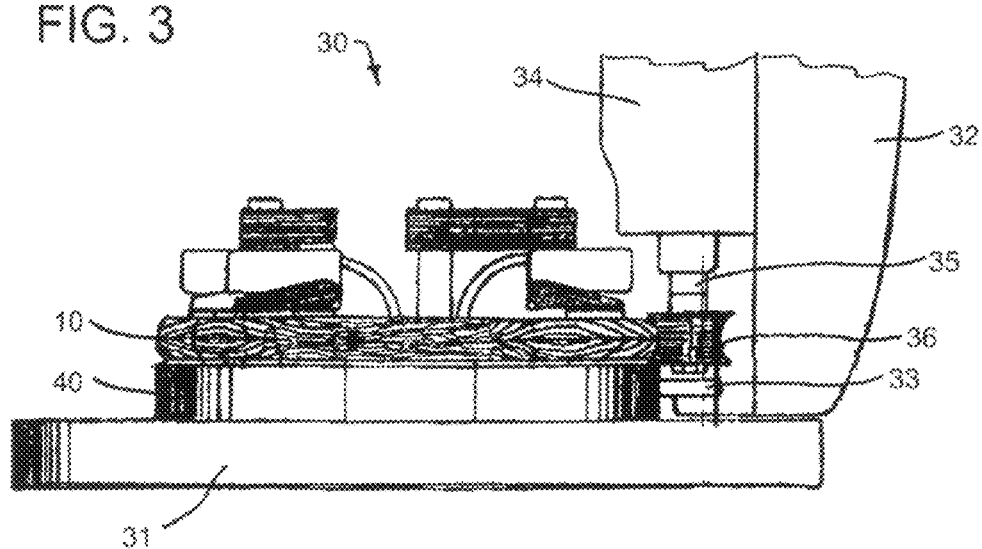
FIG. 3 is a partial elevation view of a rotary shaper suitable for use in cutting tongues and grooves in the tile of FIG. 1.

FIG. 3 is a partial view of a conventional rotary shaper 30 which uses a unique triangular template 40, in accordance with the present invention, to cut the tongues 12 and the grooves 13 in the tile 10. Numerous rotary shapers are available commercially.

The exemplary rotary shaper 30, FIG. 3, comprises a horizontal rotating table 31 and a vertical support arm 32, to which is mounted a roller guide 33 and a cutter motor 34. A pattern, here template 40 which is a regular, equilateral triangle, is clamped to the rotatable table 31 coaxially with the shaft (not shown) which rotates the table. A work piece, tile 10, is also clamped to the rotating table 31, coaxially with the shaft of the table and above and against the template 40. The roller guide 33 is mounted at the lower end of the support arm 32, adjacent the template 40. The cutter motor 34 includes a vertical shaft 35, on which is mounted a removable, interchangeable cutter 36, so that the cutter is coaxial with and above the roller guide 33 and adjacent the work piece tile 10.

Figure 8:
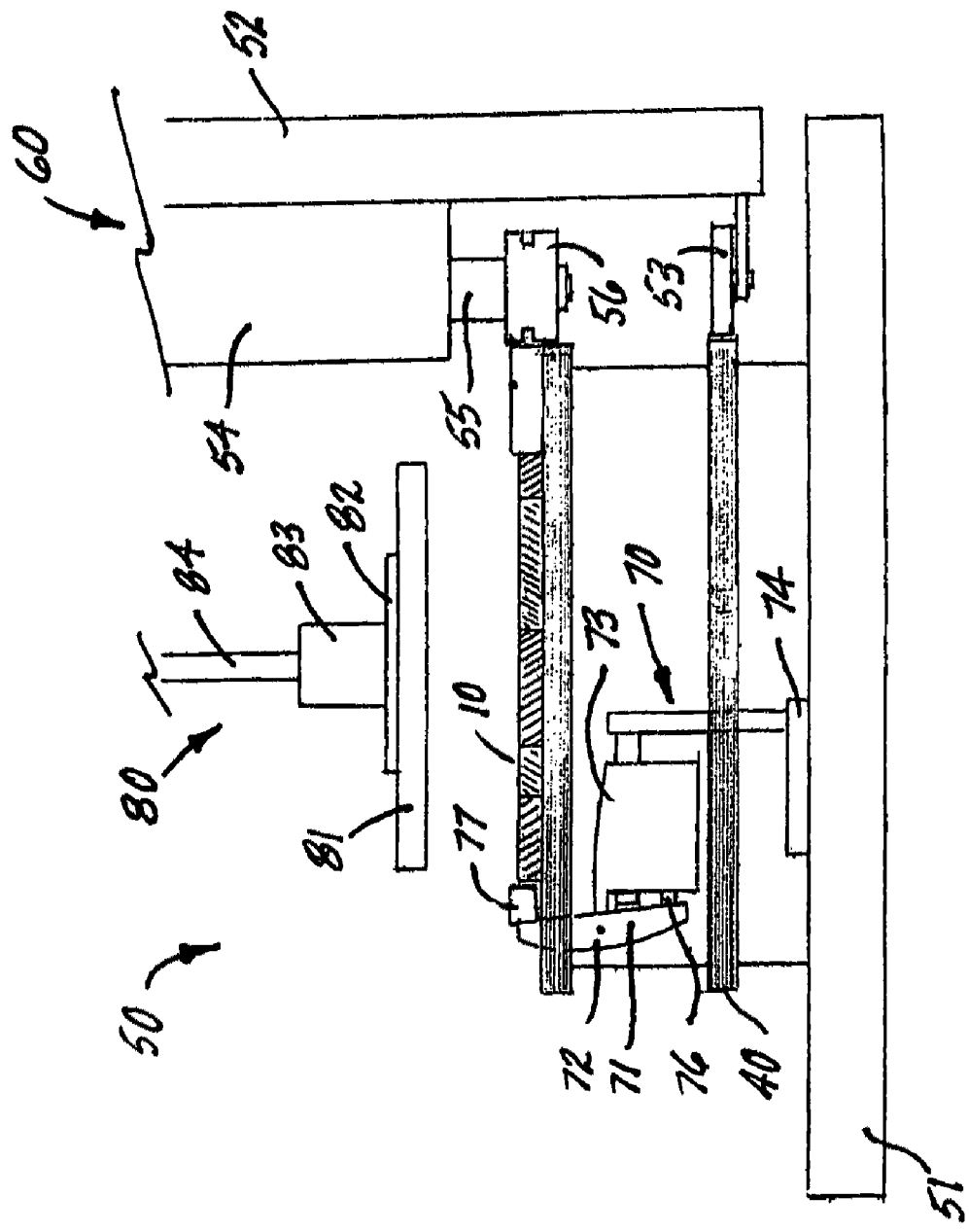
FIG. 8 is a simplified partial elevation view of a rotary shaper suitable for use in cutting tongues and grooves in the tile of FIG. 1.

FIG. 8 is a simplified partial view of a presently preferred embodiment 50 of a rotary shaper which uses a template such as triangular template 40 to cut the tongues 12 and grooves 13, FIG. 1, in tiles 10. The shaper 50 is a schematic representation of the model WA50 shaper from Onsrud Machine Corp of Chicago, Ill.

Referring further to FIG. 8, the exemplary rotary shaper 50 comprises a horizontal rotating table 51 and a swinging shaper head and guide roller assembly 60, which comprises vertical support arm or guide roller post 52, to which is mounted a guide roller 53 and a shaper head 54, which includes a cutter motor. As described below, a template or pattern, here triangular template 40, is clamped to the rotatable table 51, coaxially with the shaft (not shown) which rotates the table. Work piece, tile 10, is also clamped to the rotating table 51, coaxially with the shaft of the table and above and aligned with the template 40. The roller guide 53 is mounted at the lower end of support arm 52, adjacent the template 40. The cutter motor 54 includes a cutting head vertical shaft or arbor 55, on which is mounted a removable, interchangeable cutter (head) 56, so that the cutter is coaxial with and above the roller guide 53 and adjacent the work piece tile 10.

Referring still further to FIG. 8, as alluded to above, the tile 10 is clamped to the rotary table 51 by clamping assemblies 70 and 80. Edge clamping assembly 70 illustratively is mounted on rotary table 51 and includes a pivot arm 71 which is pivotally mounted at pivot 72 to body 73, which in turn is mounted by support member 74 to the rotary table 51. The pivot arm 71 is reversibly pivoted by using air pressure to extend and retract plunger 76 so the stop block 77 on the upper end of the pivot arm clampingly engages and releases from the edge of the tile work piece 10.

Center clamping assembly 80, FIG. 8, includes a shaft 84 to which is mounted a bearing housing 83. A backing board 81 is mounted via flange 82 to the bearing housing 83. The bearing housing rotatably mounts the backing board 81. In operation, center clamping assembly 80 and the backing board 81 are moved downwardly to clamp the work piece, tile 10, to the table. The rotatable mounting of the backing board 81 accommodates rotation of the, i.e., the backing board rotates with the clamped tile.

D. Forming Tongues and Grooves

Figure 4:
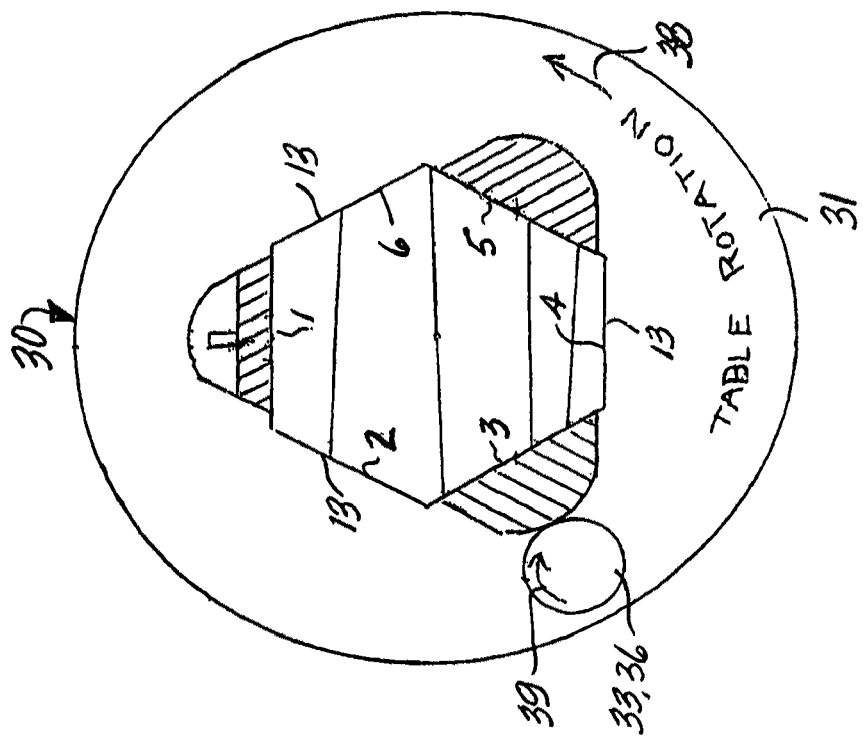
FIGS. 4 and 5 are plan drawings of the cutting table of a rotary shaper, illustrating the use of a triangular template in accordance with the present invention to cut the tongues and grooves, respectively, of the tile of FIG. 1.
Figure 5:
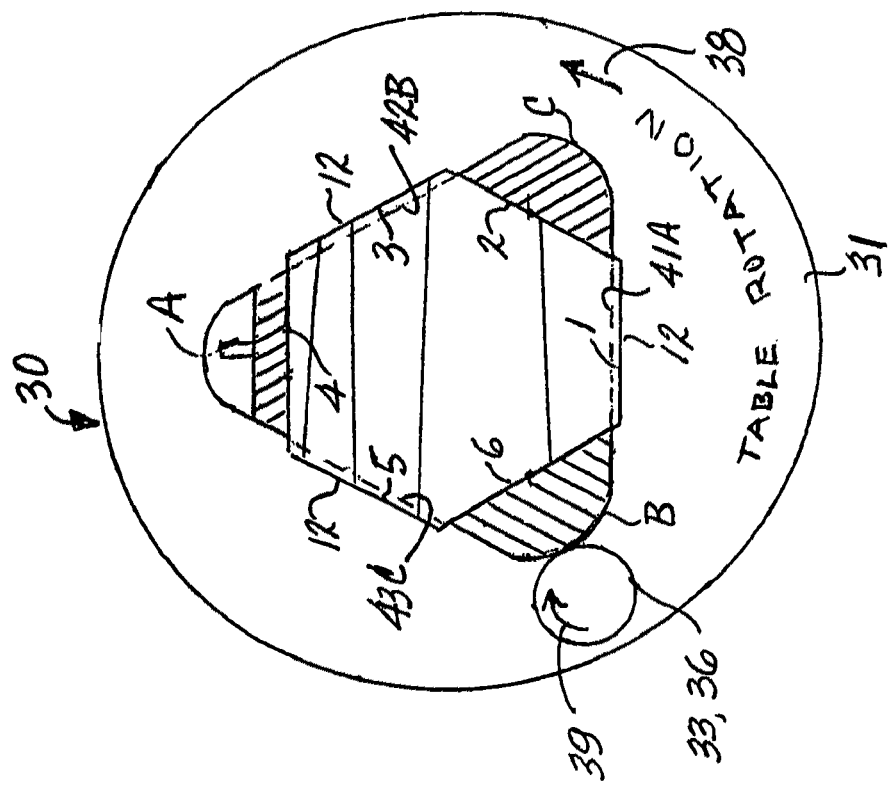

During conventional operation of the shaper 30 (and shaper 50), the roller guide 33 (53) follows along the template, the table 31 rotates in the direction indicated by arrow 38, FIGS. 4 and 5, and the cutter 36 (56) rotates in the direction indicated by arrow 39, FIGS. 4 and 5, cutting the desired profile in the periphery of the work piece.

Referring further now to FIGS. 4 and 5, in accordance with the present invention, a triangular template 40 is used which is an equilateral triangle and which has rounded vertices A, B and C lying opposite equal-length sides 41A, 42B and 43C, respectively. The distance between the template sides and their corresponding, opposite vertices is selected so that, when the template 40 is positioned adjacent the tile 10, as shown in and described relative to FIG. 3, the three sides 41A, 42B and 43C of the template are parallel to, and a relatively small distance inside, the three alternating sides 1, 3 and 5 (or 2, 4 and 6) of the tile work piece 10, while the rounded vertices A, B and C are positioned a relatively large distance outside the other sides 2, 4 and 6 (or 1, 3 and 5). Typically, the sides of the template 40 are a fraction of an inch inside the sides of the tile 10.

Forming the tongues 12-12 and grooves 13-13 is a two step process. Referring primarily to FIG. 4, in a first one of the two steps, a tongue-forming cutter 36, FIG. 3 (56, FIG. 8) is mounted on the motor shaft and the template 40 and the tile 10 are positioned and clamped on the table 31 (51) with the three sides of the template lying along the sides 1, 3 and 5 of the tile, along which sides the tongues 12-12 are to be cut. In this position, the spacing between the sides 2, 4 and 6 and the rounded vertices A, B and C of the template 40 prevents cutting of the sides 2, 4 and 6.

The shaper 30 (50) is now operated, thereby rotating the table 31 (51) and the tongue-profile cutter 36 (56) as indicated by arrows 38 and 39, respectively. During this cutting operation, the guide roller 33 rides along the periphery of the template 40, so that the close spacing between the sides of the template and the sides 1, 3 and 5 of the tile 10 allows the cutter 36 (56) to cut the tongues 12-12 in tile sides 1, 3 and 5. At the same time, the wide spacing between the rounded vertices A, B and C and the tile sides 2, 4 and 6 prevents cutting of the sides 2, 4 and 6.

In the second of the two steps, a groove-forming cutter 36 (56) is mounted on the motor shaft and the tile 10 is rotated 180 degrees relative to the template 40 (rotated 180 degrees relative to the FIG. 4 position for cutting sides 1, 3 and 5) so that the sides of the template lie along sides 2, 4 and 6 of the tile 10 and the rounded vertices A, B and C protect sides 1, 3 and 5. Operating the rotary shaper 30 (50) as before, the guide rollers 33 (53) ride along the template 40 and the cutter 36 (56) cuts grooves 13-13 in the tile sides 2, 4 and 6, while the rounded vertices prevent cutting sides 1, 3 and 5.

Of course, the above sequence can be reversed, and the grooves 13-13 cut before the tongues 12-12.

A preferred set of dimensions for the tongues 12 and the grooves 13 are shown in FIGS. 6 and 7, respectively.

In summary, in a presently preferred embodiment of the present invention, a parquet tile 10 is formed by cutting a hexagonal-shaped, strip-containing tile from a strip-containing end of a wood barrel; using a triangular template 40, tongues (or grooves) are cut along three alternating sides of the tile; and, the tile is rotated, is repositioned relative to the template; and grooves (or tongues) are cut along the other three sides of the tile.

Please note, for the illustrated polygonal tile 10 which has n=6 sides, the associated template has n/2 sides. Other polygonal tiles and templates can be used for which the tiles have n sides, n being a multiple of 2, and the templates have n/2 sides. The hexagonal tile configuration is preferred for its close packing efficiency.

The present invention has been described in terms of preferred and other embodiments. The invention, however, is not limited to the embodiments described and depicted. Adaptation to other embodiments will be readily done by those of usual skill in the art, limited only by the claims appended hereto.

What is claimed is:

1. A method of forming a parquet floor tile, comprising:
   (1) cutting a tile from an end of a wooden barrel, the tile having six edges forming a regular hexagon, and the end of the barrel being formed from wooden strips, the wooden strips having longitudinal edges and being joined along the longitudinal edges;
   (2) providing a template comprising a triangle having the sides thereof formed by extending the sides of the regular hexagon formed by the tile outward from each end of each side of the hexagon;
   (3) positioning the triangular template adjacent the hexagonal tile with a first set of three alternating sides of the hexagonal tile adjacent to and generally parallel to central regions of the three sides of the triangular template, thereby exposing the first set of three alternating sides of the hexagonal tile; and a second set of three alternating tile sides formed by the remaining three alternating sides of the tile being positioned adjacent the interior body of the triangular template, thereby protecting the second set of three alternating sides of the hexagonal tile from being cut;
   (4) cutting one of either tongues or grooves along the first set of three alternating sides of the hexagonal tile, by guiding a cutting device around the periphery of the three sides of the triangular template, thereby using the triangular template to control the cutting of the first set of three alternating sides of the hexagonal tile along the periphery of the three sides of the template and to protect the second set of three alternating sides of the hexagonal tile from being cut;
   (5) rotating the relative orientation of the template and tile 180° so that the first set of three alternating sides of the hexagonal tile are positioned adjacent the interior body of the triangular template thereby protecting the first set of three alternating sides of the hexagonal tile from being cut and exposing the second set of three alternating sides of the hexagonal tile; and
   (6) cutting the other of tongues or grooves along the second set of three alternating sides of the hexagonal tile, by guiding a cutting device around the periphery of the three sides of the triangular template, using the triangular template to control the cutting of the second set of three alternating sides of the hexagonal tile along the periphery of the three sides of the template and to protect the first set of three alternating sides of the hexagonal tile from being cut.

* * * * *